United States Patent [19]  [11] 4,312,899
Lahmann  [45] Jan. 26, 1982

[54] PROCESS FOR THE PRODUCTION OF OXIDATION-RESISTANT SINTERED SILICON NITRIDE BODIES WITH IMPROVED MECHANICAL STRENGTH

[75] Inventor: Claus-Peter Lahmann, Esslingen, Fed. Rep. of Germany

[73] Assignee: Daimler-Benz Aktiengesellschaft, Stuttgart, Fed. Rep. of Germany

[21] Appl. No.: 192,257

[22] Filed: Sep. 30, 1980

[30] Foreign Application Priority Data

Oct. 6, 1979 [DE] Fed. Rep. of Germany ....... 2940629

[51] Int. Cl.³ .............................................. B05D 3/02
[52] U.S. Cl. ...................................... 427/180; 427/94; 427/126.1; 427/126.4; 427/372.2; 428/446; 428/698; 428/701
[58] Field of Search ...................... 427/94, 372.2, 294, 427/180, 398.4, 126.1, 126.4; 428/698, 446, 701; 264/62

[56] References Cited

U.S. PATENT DOCUMENTS

| | | | |
|---|---|---|---|
| 3,824,120 | 7/1974 | Davidge et al. | 428/446 |
| 3,983,198 | 9/1976 | Mangels | 427/94 X |
| 4,112,143 | 9/1978 | Adlerborn | 264/62 X |
| 4,187,344 | 2/1980 | Fredriksson | 428/446 |

Primary Examiner—Shrive P. Beck
Attorney, Agent, or Firm—Craig and Antonelli

[57] ABSTRACT

A process for the production of oxidation-resistant sintered silicon nitride bodies having improved mechanical strength involves dissolving aluminum oxide, aluminum nitride, or mixtures thereof by diffusion in the surface of the sintered silicon nitride bodies. The diffusion is effected by embedding the bodies within powder of aluminum oxide, aluminum nitride or mixture thereof and by heating the embedded bodies to a temperature of at least 1300° C.

10 Claims, No Drawings

PROCESS FOR THE PRODUCTION OF OXIDATION-RESISTANT SINTERED SILICON NITRIDE BODIES WITH IMPROVED MECHANICAL STRENGTH

Sintered bodies of silicon nitride ($Si_3N_4$) are utilized to an increasing extent as thermally and highly stressable components, due to their high heat resistance and stability with respect to temperature changes. They are produced by reactive sintering, pressureless sintering, hot-pressing, or hot isostatic pressing.

Although sintered silicon nitride bodies can be utilized, depending on the mechanical stress, at temperatures of up to about 1600° C. or above in a vacuum or in an inert atmosphere, an oxidation of $Si_3N_4$ to $SiO_2$ can take place in an oxidizing atmosphere starting at temperatures of 850° C., or above. The thus-formed $SiO_2$ can form silicates with the calcium, yttrium, or magnesium compounds present as impurities or sintering adjuvants, enhancing the further diffusion of oxygen into the silicon nitride body. Decomposition phenomena take place on the surface of the body, and the mechanical strength of the sintered body is decisively weakened.

Thus, the observation has been made especially on yttrium oxide-containing, hot-pressed silicon nitride bodies that decomposition phenomena occur as early as after a few hours in an oxidizing atmosphere at temperatures of between 700° C. and 1000° C., progressing up to a complete destruction (F. F. Lange, et al., Amer. Ceram. Soc. 60, No. 5–6 [1977]: 249–252).

Therefore, it is an object of the invention to produce a sintered silicon nitride body having an increased oxidation resistance and improved mechanical stability.

This object has been attained by the process of the present invention wherein aluminum oxide, aluminum nitride or a mixture thereof is provided in the surface regions of the silicon nitride body.

In this process, sintered silicon nitride bodies are utilized which are produced according to the generally conventional methods, such as reactive sintering or hot-pressing.

By means of diffusion, aluminum oxide, aluminum nitride, or a mixture thereof is introduced into the surface or exposed regions of the sintered $Si_3N_4$ body, thus producing a protective outer layer consisting of phases which cannot be oxidized at all or are oxidizable only with extreme difficulties, this layer being stable and practically excluding any further oxidation of the basic silicon nitride material within the body. The diffusion is effected most simply by annealing the sintered body for 3 to 40 hours in aluminum oxide powder and/or aluminum nitride powder at temperatures of 1300° C. and above. In this connection, the powder of aluminum oxide and/or aluminum nitride is to be maximally fine-grained; particle sizes of below 20 μm are preferred. An additional possibility resides, for example, in coating the sintered body with a thin layer of the aluminum compound, e.g. by applying a slurry, and thereafter annealing the body which has optionally been dried previously.

Diffusion is accomplished at temperatures of 1300° C. and above since below this 1300° C., the diffusion rate decreases to such an extent that the reaction periods become too long for an economical process. The upper temperature limit is dependent on the composition of the silicon nitride starting component, i.e., the body being treated, wherein hot-pressed sintered bodies, due to their content of auxiliary sintering agent, e.g., MgO, $Y_2O_3$, etc., generally cannot be stressed thermally as highly as reactive-sintered bodies. The absolute top limit is set in any event by the dissociation temperature of silicon nitride, i.e., 1900° C. Temperatures of between 1340° C. and 1600° C. are preferred for the diffusion treatment, since in this range a high diffusion rate can be achieved while the bodies still exhibit a high mechanical strength during diffusion.

In general, an annealing period of at least 3 hours is required for diffusion. The duration of the annealing step is dependent, on the one hand, on the temperature, wherein high temperatures require a shorter annealing time, and on the thickness to be obtained by the thus-produced protective diffusion layer. An annealing period of about 30–80 hours is preferred. For most purposes, a protective layer is sufficient which has a thickness (depth) of about 10 μm. By the diffusion of the aluminum compounds into the surface, an increase in volume is attained in the surface by an increase in the crystal lattice, leading to a compressive prestress in the surface. Due to this compressive prestress, the sintered bodies produced according to the invention become substantially less sensitive to surface flaws and damage to the surface, which can occur during the manufacture of the crude sintered body or during usage of the finished sintered bodies.

Diffusion can be conducted under vacuum ($<10^{-2}$ mm Hg), but the treatment in a gaseous atmosphere inert with respect to silicon nitride is preferred since it is simpler from a technological viewpoint. This inert gas atmosphere preferably consists of nitrogen, noble gases, e.g. argon, or mixtures thereof. By the addition of a small amount of hydrogen, up to about 6 vol-%, to the inert gas atmosphere, the diffusion rate of the aluminum compounds into the surface of the silicon nitride body can be accelerated. Instead of hydrogen, it is also possible to employ compounds which disintegrate under the reaction conditions with the formation of hydrogen, for example ammonia.

The sintered silicon nitride bodies produced according to the process of this invention are substantially more oxidation-resistant as compared with untreated bodies and can be utilized in an oxidizing atmosphere at temperatures at which the conventional bodies already disintegrate within a short period of time.

COMPARATIVE EXPERIMENT A

Bend test specimens of hot-pressed silicon nitride (HPSN) with a content of 8% by weight of yttrium oxide ($Y_2O_3$) as the auxiliary sintering agent were heated in air to 750° C. After 10 hours of oxidation, decomposition phenomena occurred, such as the formation of cracks on the surface and in the interior of the material. Thereby the bending strength $\sigma$ dropped from originally 840 $N \cdot mm^{-2}$ to below 200 $N \cdot mm^{-2}$. An oxidation period longer than 20 hours resulted in the complete destruction of the material.

EXAMPLE 1

Six bend test specimens of the hot-pressed silicon nitride (HPSN) with 8% by weight of $Y_2O_3$ were annealed in an atmosphere of $N_2 + 5$ vol-% $H_2$ at 1340° C. in a closed tubular furnace for 80 hours, the individual specimens having been completely embedded in an $Al_2O_3$ powder with a particle size of about 2–5 μm.

The thus-treated specimens were then oxidized in air at 750° C. for 80 hours. No crack formation could be observed. The bending strength determined after oxidation now amounted, on the average, to 660 N·mm$^{-2}$ (minimum 590 N·mm$^{-2}$; maximum 720 N·mm$^{-2}$).

EXAMPLE 2

Six bend test specimens of the hot-pressed silicon nitride (HPSN) with the 8% by weight of $Y_2O_3$ were annealed in an atmosphere of $N_2+5$ vol-% $H_2$ at 1340° C. in a closed tubular furnace for 80 hours, the individual specimens having been completely embedded in an AlN powder having a particle size of about 2 μm.

The thus-treated specimens were then oxidized in air at 750° C. for 80 hours. No damage could be observed, such as crack formation, for example. The surface had a vitreous appearance. The bending strength determined after oxidation was, on the average, 410 N·mm$^{-2}$ ($\sigma_{max}$=490 N·mm$^{-2}$; $\sigma_{min}$=380 N·mm$^{-2}$).

EXAMPLE 3

Six bend test specimens of the hot-pressed silicon nitride (HPSN) with the 8% by weight of $Y_2O_3$ were annealed in an atmosphere of $N_2+5$ vol-% $H_2$ at 1420° C. in a closed tubular furnace for 40 hours, the individual specimens having been completely embedded in a mixture of 70% $Al_2O_3$ and 30% AlN powder.

After 80 hours of oxidizing in air at 750° C. and for 25 hours at 1000° C., the average bending strength was 680 N·mm$^{-2}$ ($\sigma_{max}$=740 N·mm$^{-2}$; $\sigma_{min}$=610 N·mm$^{-2}$).

EXAMPLE 4

Six bend test specimens of hot-pressed silicon nitride with a content of about 5% by weight of MgO were annealed in an atmosphere of $N_2$ at 1420° C. for 40 hours, the specimens having been completely embedded individually in a powder mixture of 70% $Al_2O_3$ and 30% AlN.

After subsequently conducting an oxidation in air for 60 hours at a temperature of 1300° C., the average bending strength was $\sigma$=560 N·mm$^{-2}$ and thus was higher by 25–30% than the bending strength of untreated comparison specimens, in spite of double the oxidation period.

The oxidation rates in specimens heat-treated as described above were markedly reduced as compared with untreated comparison specimens.

COMPARATIVE EXPERIMENT B

Bend test specimens of the hot-pressed silicon nitride with the content of about 5% by weight of magnesium oxide as the auxiliary sintering agent and with a starting bending strength $\sigma$ of 850 N·mm$^{-2}$ were heated in an oxidizing atmosphere (air) for 30 hours to a temperature of 1300° C. Thereafter, the bending strength of the specimens was 430 N·mm$^{-2}$, i.e., at this point only about 50% of the initial value.

I claim:

1. A process for the production of oxidation-resistant sintered silicon nitride bodies having improved mechanical strength, characterized in that a material consisting essentially of aluminum oxide, alumininum nitride, or mixtures thereof is dissolved by diffusion in the surface of the sintered silicon nitride bodies at temperatures of not more than 1900° C.

2. A process according to claim 1, characterized in that the diffusion is executed by annealing the sintered silicon nitride bodies for 3–40 hours in a powder consisting essentially of aluminum oxide powder, aluminum nitride powder or mixtures thereof at temperatures of 1300° C. and above.

3. A process according to claim 2, characterized in that the annealing step is conducted in an atmosphere inert with respect to silicon nitride.

4. A process according to claim 3, characterized in that the inert atmosphere consists of nitrogen and/or noble gases.

5. A process according to claim 1, wherein the diffusion of the material is effected by embedding the sintered nitride bodies within finely divided powder of said material, and by heating the embedded bodies and powder to a temperature ranging from 1300° to not more than 1900° C. within a vacuum or an atmosphere inert to the silicon nitride for a period of at least 3 hours.

6. A process according to claim 1, wherein the diffusion is effected at a temperature of from 1340° to 1600° C. for a period of from 30–80 hours.

7. A process according to claim 1, wherein the diffusion is effected for a period of time and at a temperature of at least 1300° C. to provide a protective surface layer on the silicon nitride bodies of about 10 μm.

8. A process according to claim 1, wherein the diffusion is effected by embedding the individual silicon nitride bodies within a finely divided aluminum oxide powder and by heating.

9. A process according to claim 1, wherein the diffusion is effected by embedding the individual silicon nitride bodies within a finely divided powder of aluminum nitride and by heating.

10. A process according to claim 8 or claim 9 wherein the powder has a particle size of 20 μm or less.

* * * * *